United States Patent
Williams, Jr. et al.

(10) Patent No.: US 7,328,172 B2
(45) Date of Patent: Feb. 5, 2008

(54) PROVISION OF ELECTRONIC COMMERCE SERVICES

(75) Inventors: Paul Levi Williams, Jr., Damsville, MD (US); Marcellous P. Frye, Jr., Columbia, MD (US)

(73) Assignee: GXS, Inc., Gaithersburg, MD (US)

( * ) Notice: Subject to any disclaimer, the term of this patent is extended or adjusted under 35 U.S.C. 154(b) by 1201 days.

(21) Appl. No.: 09/741,994

(22) Filed: Dec. 22, 2000

(65) Prior Publication Data
US 2002/0194076 A1    Dec. 19, 2002

Related U.S. Application Data

(60) Provisional application No. 60/186,685, filed on Mar. 3, 2000.

(51) Int. Cl.
*G06Q 30/00* (2006.01)
(52) U.S. Cl. ...................................... 705/26
(58) Field of Classification Search .................. 705/26, 705/27
See application file for complete search history.

(56) References Cited

U.S. PATENT DOCUMENTS

| | | | | |
|---|---|---|---|---|
| 5,758,328 A | * | 5/1998 | Giovannoli | 705/26 |
| 5,862,325 A | * | 1/1999 | Reed et al. | 709/201 |
| 5,913,210 A | * | 6/1999 | Call | 707/4 |
| 5,950,173 A | * | 9/1999 | Perkowski | 705/26 |
| 5,961,593 A | * | 10/1999 | Gabber et al. | 709/219 |
| 5,970,475 A | * | 10/1999 | Barnes et al. | 705/27 |
| 6,219,653 B1 | * | 4/2001 | O'Neill et al. | 705/400 |
| 6,408,292 B1 | * | 6/2002 | Bakalash et al. | 707/2 |
| 6,721,713 B1 | * | 4/2004 | Guheen et al. | 705/1 |

FOREIGN PATENT DOCUMENTS

WO   WO 98/32289   *   7/1998

OTHER PUBLICATIONS www.ediconsulting.com, dated Oct. 14, 1999 and copyrighted 1996.*
Jilovec, Nahid, "EDI can have unexpected side effects. (EDI impacts external relations and internal procedures)" MIDRANGE Systems , v9 , n8 , p. 32(1), May 24, 1996.*
Eliot, Lance B., "Electronic data interchange: the new-fashioned AI way." AI Expert, v7 , n8 , p. 9(3), Aug. 1992.*

* cited by examiner

*Primary Examiner*—Michael Cuff
(74) *Attorney, Agent, or Firm*—Foley & Lardner LLP

(57) ABSTRACT

Users access a host server which, in a structured manner, generates questions regarding electronic commerce requirements. The responses are used to automatically determine suitable electronic commerce products and services and to allow user registration for selected products and services.

28 Claims, 10 Drawing Sheets

PROVISION OF ELECTRONIC COMMERCE SERVICES

CROSS-REFERENCE TO RELATED APPLICATION

This application claims the benefit of priority under 35 U.S.C. §119(e) of provisional application Ser. No. 60/186,685 filed Mar. 3, 2000, the disclosure of which is incorporated herein in its entirety.

BACKGROUND OF THE INVENTION

1. Field of the Invention

The invention relates generally to the provision of electronic commerce services and, more specifically, to an online system and method for determining and fulfilling a user's needs for electronic commerce services and products.

2. Description of the Related Art

Electronic commerce (EC) involving electronic data interchange (EDI) has become increasing important for businesses with the spread of the internet and private communications networks. Electronic commerce involving electronic data interchange is referred to below as EC/EDI or simply EDI for convenience. In particular, business-to-business EC/EDI is increasingly important for both suppliers and customers. EC/EDI provides for the electronic exchange across a telecommunications network of commercial and official documents, such as orders and invoices. This permits business transactions to be performed electronically. Examples of such transactions include ordering goods from suppliers, receiving orders from customers, and sending acknowledgements, delivery documents, and invoices. No paper documents are exchanged, resulting in greater speed and accuracy, and requiring less labor to perform the transaction.

Where one business has established the infrastructure necessary to conduct EC/EDI, others who are trading with that business or who wish to trade with that business may find it advantageous to also establish the necessary infrastructure. For example, a large retailer may set up a system for performing EC/EDI with its suppliers, in order to electronically order goods and electronically process the resulting invoices. The retailer may demand that its suppliers be able to accept orders and send invoices electronically, in a compatible format, or give preference to those suppliers who can. As another example, a manufacturer may set up a system for performing EC/EDI with its customers, to accept orders, and send acknowledgements, delivery documents, and invoices electronically. The manufacturer may, for example, provide a discount, or faster service for customers able to communicate electronically.

At present, the process of setting up systems for EC/EDI involves a good deal of administration and is time-consuming for all parties. In order for two businesses to perform EC/EDI, the software and systems adopted by each business must be compatible with each other. This requires coordination of the types of business documents to be exchanged, the data format for the exchange, the protocols to be used for the exchange, and many other technical and commercial details. The coordination of these requirements, the purchase of software and services to enable the EC/EDI, and the configuration and setup of the EC/EDI system is time consuming, labor intensive, and can be particularly difficult for businesses without the technical expertise to understand these requirements.

The invention is directed towards addressing these problems.

SUMMARY OF THE INVENTION

According to a first aspect of the invention, there is provided a method for providing electronic commerce products and services, the method comprising the steps of providing a server for access by a user, the server prompting the user to input responses to questions relating to their electronic commerce requirements, and the server automatically determining suitable electronic commerce products and services and allowing the user to register for these products and services. The server preferably retrieves information relating to the requirements of a trading partner and uses this information to determine suitable electronic commerce services or products, and the server may retrieve this information by accessing a database which stores information relating to a hub.

The server preferably uses information gathered in the user responses to set up selected products or services, and may also transmit messages to sales channels to follow up in providing the user's requirements. The server preferably saves responses and allows a user to interrupt a response session and return to the session at a later time, and may also generate service information and provides it to the user, which may include cost and return-on-investment data.

The server preferably generates user prompts according to a decision tree, and may also dynamically generate required display pages based on user entries and results. The server may be arranged with logic residing in controller classes which co-ordinate logic flow.

In a further embodiment, the step of registering for a service comprises the sub-steps of using registration page modules for capture and validation of registration information. The registration step may include registration to an EDI or EC service or product, and may include registration to an EDI or EC mailbox service. The registration step may also include linking the user to remote applications.

According to another aspect of the invention, a method for providing electronic commerce products and services comprises providing a host server for access by a user, obtaining first information from the user to identify a trading partner, retrieving requirements information relating to predetermined electronic commerce requirements of the trading partner, determining suitable electronic commerce products or services for the user based at least in part on the requirements information, and obtaining registration information from the user to register the user for one or more of the products or services.

The server preferably retrieves the requirements information from a database containing electronic commerce requirements information for a plurality of hub trading partners. The registration information is preferably obtained by prompting the user to enter information into one or more preformatted displays.

The method may also include the additional steps of dividing the registration information into common registration information and other registration information, and storing the common registration information so that it is readily accessible in a block. The step of obtaining registration information may also comprise prepopulating one or more of the preformatted displays with common registration information previously entered by the user.

The method may also include the step of prompting the user for configuration information to configure one or more of the products or services, and the step of automatically generating and sending a message to a sales channel to follow up in providing electronic commerce products or services desired by the user. Return-on-investment information relating to an e-commerce product or service may also be generated and provided to the user, and registration page modules may be used for receiving and validating at least a portion of the registration information. Obtaining registration information may involve linking the user to remote applications.

According to a further aspect, the invention provides a system for providing electronic commerce products and services, the system comprising a database for storing requirements information relating to predetermined electronic commerce requirements of a plurality of trading partners, an application for obtaining first information from the user to identify a trading partner, retrieving requirements information from the database based at least in part on the first information, and displaying suitable electronic commerce products or services to the user based at least in part on the requirements information, and a registration module for obtaining registration information from the user to register the user for one or more of the products or services.

The database preferably stores electronic commerce requirements information for a plurality of hub trading partners. The registration module preferably obtains the registration information by prompting the user to enter information into one or more preformatted displays. The registration module preferably divides the registration information into common registration information and other registration information, and stores the common registration information so that it is readily accessible in a block. The registration module preferably prepopulates one or more of the preformatted displays with common registration information previously entered by the user, and preferably prompts the user to enter the registration information into one or more displays which are dynamically generated based on previously entered information.

BRIEF DESCRIPTION OF THE DRAWINGS

The invention will be more clearly understood from the following description of some embodiments thereof, given by way of example only, with reference to the accompanying drawings in which.

Figure 1:
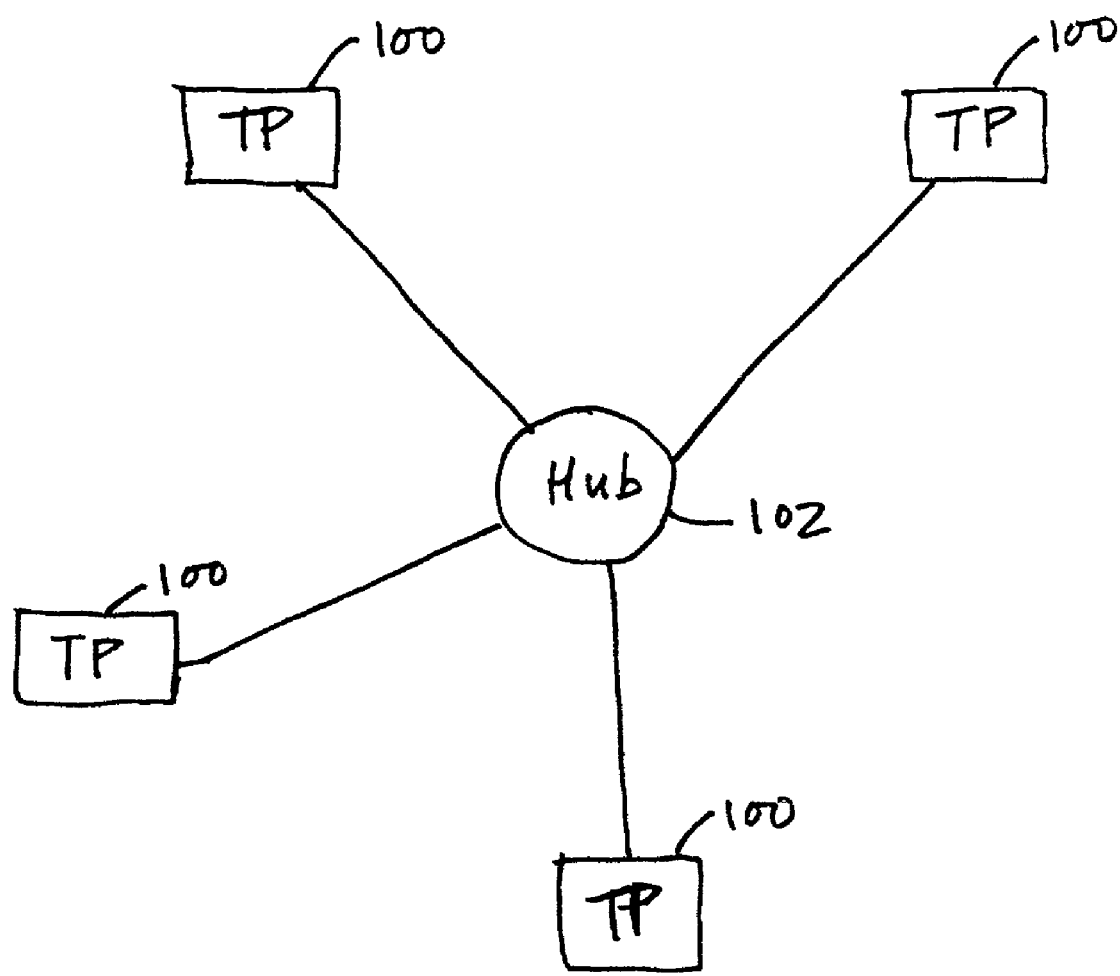
FIG. 1 is a diagram showing the connection between trading partners and a hub for exchanging business transactions.

While the invention is susceptible to various modifications and alternative forms, specific embodiments have been shown by way of example in the drawings and will be described in detail herein. However, it should be understood that the invention is not limited to the particular forms disclosed. Rather, the invention covers all modifications, equivalents, and alternatives falling within the spirit and scope of the invention as defined in the appended claims.

DETAILED DESCRIPTION OF SPECIFIC EMBODIMENTS

This application is related to provisional application Ser. No. 60/186,685 filed Mar. 3, 2000, which is hereby incorporated by reference as if fully set forth herein.

One embodiment of the present invention includes a system and method for the provision of products and services to facilitate electronic commerce (EC) and electronic data interchange (EDI) among trading partners (TPs). The following description refers generally to products and services, which is intended to encompass products (for example, software and documentation) and services (for example, the EDI mailbox service) to facilitate EC and/or EDI. The system and method provides facilities to allow a user to:

(a) link with potential or existing trading partners;

(b) obtain information about EC/EDI products and services for linking to trading partners, based on the requirements of those trading partners;

(c) register on-line for products and services from the host organization (of third party providers);

(d) select a communication medium for EC/EDI (e.g., internet or private network), and order software to implement EC/EDI using that medium;

(e) identify the user's unique EDI address; and (f) confirm trading partner requirements for EC/EDI with other trading partners.

The provision of the above services is preferably achieved via access to a host server which controls the process in a structured manner. A user may access the host server via the internet, private network, or any other suitable communication means. In this description, the system for providing the above services is referred to as the "host server," although the system may include one or more web servers, application servers, and other hardware and software necessary to perform the functions described, and the system may be distributed geographically. The organization which manages the host server is referred to as the "host organization," the persons or companies which use the EC services are referred to as "trading partners" (TPs), and a trading partner who accesses the host server to obtain the above services is referred to as a "user." The user may be an individual, a group, a department, or an entire organization. The user may be a trading partner acting as a hub or a trading partner wishing to trade with an existing hub.

The host server preferably automates the business processes between two or more trading partners and the host organization for the host server. For example, the host server recognizes a trading partner, "knows" what trading formats and applications are acceptable to the trading partner, presents as options only those products and services which are acceptable to the trading partner, and then provides information in the form of Return On Investment (ROI) calculations and recommends product and service purchases to the user. The user is then able to complete an order or registration for these products and services. The host server preferably uses information in an Oracle database to achieve this, although other databases and other means may be used.

In the following description, the host server web site addresses are occasionally referred to as GEGXS.COM, GEGXS.NET, GEIS.COM, and GEIS.NET. However, the web site addresses may, of course, be different.

Referring initially to FIG. 1, a conceptual diagram is shown with one or more trading partners 100 in communication with a trading partner at hub 102 for transacting business using EC/EDI. The hub 102 may be implemented as a web site located on a server operated by a host organization, or operated by the hub trading partner. The trading partners 100 typically communicate with the hub via the internet or other suitable communications network. For example, the trading partners 100 may be a large number of suppliers of merchandise to a department store which is the trading partner at hub 102. As another example, the trading partners 100 may be users of a factory which is the trading partner at hub 102. Typically, the trading partner at hub 102 has developed an infrastructure for performing EC/EDI, and the trading partners 100 conform to the requirements of the hub trading partner in order to transact business with the hub 102.

Figure 2:
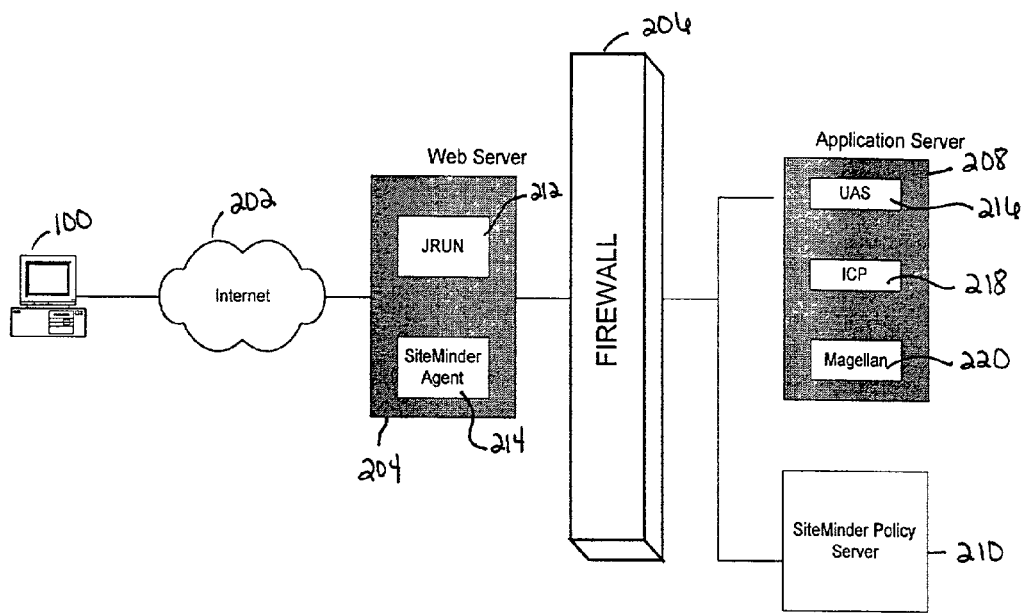
FIG. 2 is a block diagram illustrating a system and the manner in which it interfaces with users.

FIG. 2 shows a simplified block diagram of trading partners 100 connected through the internet 202 to a web server 204. The web server 204 is connected via firewall 206 to an application server 208 and Siteminder Policy Server 210. The web server 204 is used to serve up web pages and data. Netscape Enterprise Server is a suitable web server application for this purpose. The web server 204 may include JRUN 212 and SiteMinder Agent 214. JRUN 212 is an example of a plug-in application to the web server 204 that enables the web server 204 to serve (i.e., "render" or "display") Java Server Pages (JSP) which may contain HTML and Java code. JRUN is a product from Allaire Corporation. SiteMinder Agent 214 operates in conjunction with the Siteminder Policy Server 210 described below.

Application server 208 may include Unified Administration Service (UAS) 216, Internet Component Platform (ICP) 218, and Magellan 220. UAS 216 is a universal directory for recording EDI mailbox addresses so that this information is available for multiple applications. ICP 218 is a platform upon which GEGXS.Net and related applications reside. Functions provided by ICP 218 include application management, user management and authentication. Magellan 220 is an example of an online application to enable online ordering of software, documentation, and other products and services.

Siteminder Policy Server 210 runs the Siteminder application (a product from Netegrity company) that is integrated with ICP 218 and provides web application based user authentication and authorization.

Figure 3:
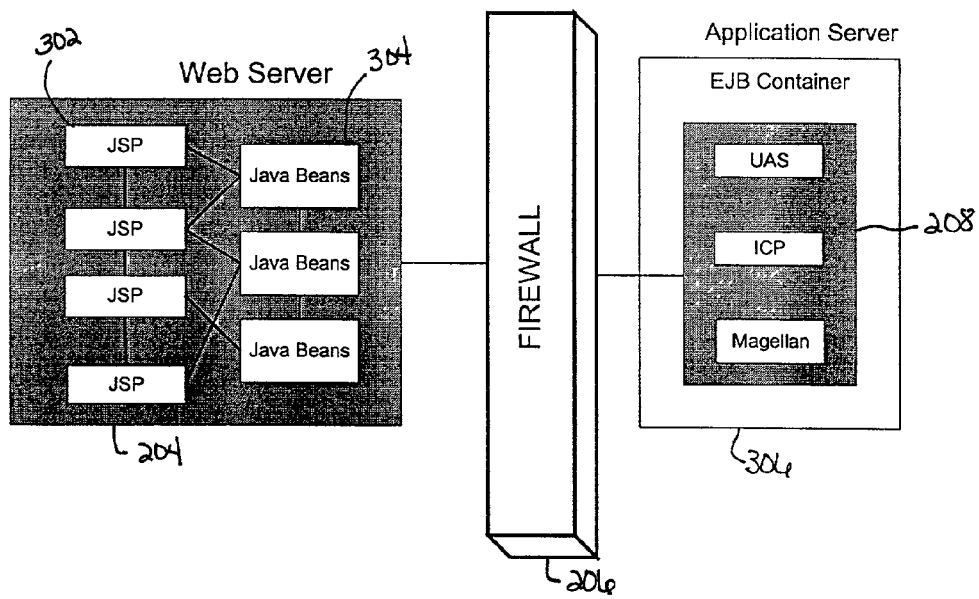
FIG. 3 is a block diagram showing additional details of the web server of FIG. 2.

FIG. 3 shows details of the web server 204. The user preferably uses a web browser to enter the GEGXS.NET web site hosted on the GXS web server via the Internet. Static or dynamic web pages may be returned to the user upon access to the web site, based on the user's input. Dynamic web pages are generated using JavaServer Pages (JSP) 302. JSP 302 is a page that contains both HTML and JRUN code written in Java. Each block of the JRUN code is surrounded by tags. The JRUN code embedded inside the JSP contains presentation logic, application logic, or business logic, or any combination of these. The JSP page 302 is able to handle one of more types of requests. The first time the JSP page 302 is requested, the web server's JRUN engine compiles the JSP page, creates a JRUN instance, and loads it in the web server. Once the JRUN instances are loaded in the web server, a request is dispatched by the web server to the appropriate instance. The resultant HTML page is then responded from the web server to the browser. The JRUN engine is a plug-in designed to support the full JRUN API.

Users preferably interact with the web server via their web browsers. Each HTTP request is sent over the Internet. The web server passes the request to the appropriate JRUN instance to handle the request and respond back to the user after the request is processed. Thus, a JRUN/JSP page is required to have any combination of the presentation logic, application logic, and/or business logic to process the request. This requirement makes JRUN/JSP pages relatively large. However, the preferred approach is to develop lightweight JRUN/JSP pages. To make JRUN/JSP pages lightweight, JSP is used in cooperation with JavaBeans 304, or reusable Java classes. JavaBeans 304 may contain presentation logic, application logic, or business logic, or any combination of different types of logic. The JavaBean components can be easily inserted or removed. This component architecture makes the web application powerful, flexible, portable, extensible, reusable, modularized, robust, and highly maintainable.

The users may use any one of the widely available browsers and preferably enable the JavaScript and Cookie browser options. JavaScript is used to validate the data being entered. Cookies are required in cases where the network is integrating with another application to perform a single task. Cookies enable applications to flow back and forth while maintaining the same session for the user.

Figure 4:
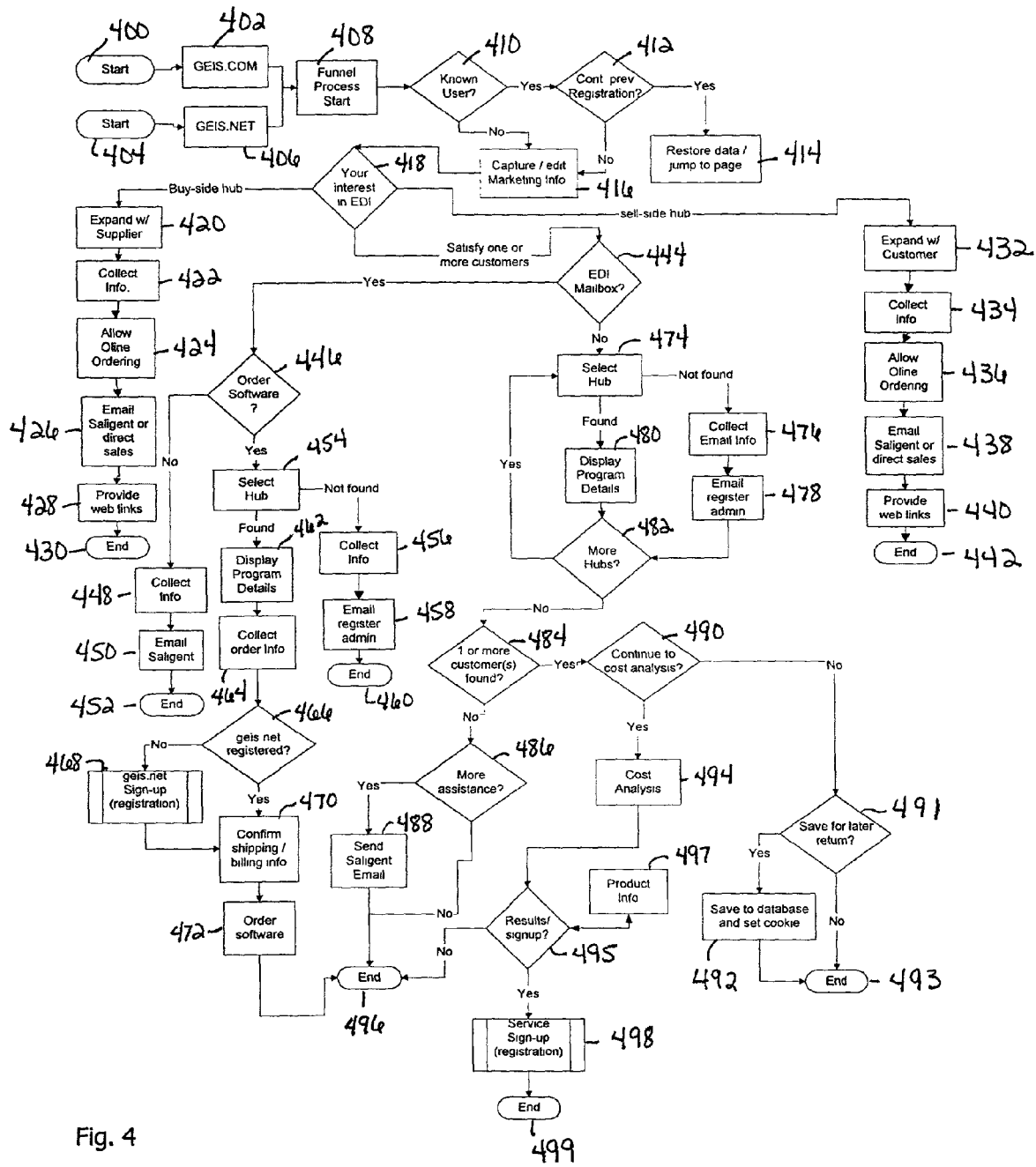
FIG. 4 is a flowchart showing a user qualification funnel process for selection and purchase of EC/EDI products and services.

FIG. 4 shows a flow diagram for a process referred to as a "user qualification funnel" or "solution selection process" implemented by the host server. This process assists users in determining the best EC/EDI solution to fit their needs. The funnel utilizes a decision tree approach that gathers information and "walks" the user through a series of questions to determine an appropriate solution for the user. The questions are preferably presented in a series of displays with preformatted fields labeled to indicate the nature of the information to be entered by the user into the fields. The information entered by the user in the fields of one display may then be used to determine the next display shown to the user. The result of this process is that the user is either presented with products and services which they can immediately register for, or various types of emails are sent to the appropriate sales channel to follow up regarding the user's specific needs. The recommendations made by the host server to fulfil a user's requirements may be made on the basis of the requirements or attributes of a trading partner hub with whom the users wishes to trade.

When the user completes the funnel and selects a product or service to sign up for, the registration process is started. Information that the user has entered in the funnel process is utilized during this processing.

As shown in FIG. 4, the funnel itself is divided into several components. After some initial selections, the user is directed into the "buy-side hub," the "sell-side hub," or the process for a trading partner to order software or other products for EDI with a selected hub, or sign up for an EDI mailbox to establish EDI capability with a hub.

After accessing the host server web site, the funnel process begins at step 408. The user may access the funnel through one or more different web sites. For example, the user may log on to the GEGXS.COM web site (steps 400 and 402) or the GEGXS.NET web site (steps 404 and 406). The user is initially prompted for information to determine whether the user is known to the host server in step 410. If the user had previously begun the process of registering with the service but did not complete the registration process, the funnel process will jump back to the point at which the user previously stopped the process, as shown in steps 412 and 414.

If the user is not known to the host server, or had not previously completed the registration process, the funnel will prompt the user to enter or update relevant demographic and other information useful for marketing, as shown in step 416. In step 418 the user is prompted to supply information to determine the nature of their interest in EDI products or services.

If the user wishes to establish or expand their capability for EDI with their suppliers, the user will be directed to the "buy-side hub" process at step 420. The host server will collect information as to the users specific requirements and provide facilities for the user to order software or other products and services online from the web site, as shown in steps 422 and 424. At step 426, an email message is automatically generated and sent to a telemarketing or sales group if necessary. A message may be generated if the user's requirements are not clear or cannot be met by the standard products and services offered, if the user requests a follow-up contact or requests more information, or for any other reason requiring intervention of a sales person into the process. Links to other web pages and sites are provided relevant to the customer's interests, and the process ends, as shown in steps 428 and 430.

If the user wishes to establish or expand their capability for EDI with their users, the user will be directed to the "sell-side hub" process at step 432. Similarly to the buy-side hub, the host server will collect information as to the users specific requirements and provide facilities for the user to order software or other products and services online from the web site, as shown in steps 434 and 436. At step 438, an email message is automatically generated and sent to a telemarketing or sales group if required, similarly to step 426. Links to other web pages and sites are provided relevant to the user's interests, and the process ends, as shown in steps 440 and 442.

If the user is a trading partner who wishes to order software or other products for EDI with a selected hub, or sign up for an EDI mailbox to establish EDI capability with one or more hubs, the user proceeds to step 444. Initially, it is determined whether the user already has an EDI mailbox, as shown in step 444. If the user does have an EDI mailbox, the user is asked whether she wishes to order software or some other product or service (or review information for a product or service) at step 446. If the user does not want to place an order or review product or service information, the host server collects additional information from the use at step 448 to determine what the user wants. An email message is automatically generated and sent to a telemarketing or sales group at step 450, in order to initiate a follow-up telephone call or other follow-up with the user to determine how the user can be assisted.

If the user wishes to place an order or view information regarding products or services, the user is prompted to identify a hub, as shown in step 454. This is the hub with which the user is trading as a supplier or user (or with which the user wants to begin trading). Identifying the hub permits the host server to present the user with information and products applicable to that particular hub, to avoid the confusion and waste of time of presenting the user with a long list of products and services which will not function with the selected hub. The host server will search for all existing hubs and provide a list of the hubs from which the user can make a selection. The host server may also permit the user to enter the name of a hub and match the entered name with a directory of existing hubs. If the hub identified by the user can not be found in the host server's directory, additional information is collected from the user at step 456, and an email message is automatically generated and sent to the appropriate administration group at step 458, in order to initiate a follow-up telephone call or other action to resolve the problem.

If the user selects an existing hub, or the hub is found in the directory, information regarding the details of the EDI facilities available on the selected hub is presented to the user, as shown in step 462. This information may include, for example, the identity and description of the software packages necessary to support different types of commercial transactions with the hub, and may include particular configurations of the software specifically applicable to the selected hub. At step 464, the host server collects information relating to any products or services the users wishes to order. If the user is not already registered with the host server (step 466), the user is sent to the registration process in order to sign up, as shown in step 468 (and shown in more detail in FIG. 5). If the user is placing an order, shipping and billing information are confirmed, and terms and conditions are approved, at step 470. The order is then placed at step 472, and the process ends at step 496.

If the user does not have an EDI mailbox, the user is requested to select a hub at step 474, similarly to step 454 described above. If the hub identified by the user can not be found in the host server's directory, additional information is collected from the user at step 476, and an email message is automatically generated and sent to the appropriate administration group at step 478 to initiate a follow-up telephone call or other action to resolve the problem. If the hub selected is found in the directory, information regarding the details of the EDI facilities available on the selected hub is presented to the user, as shown in step 480. The information presented may include a description and configurations of the software packages specifically applicable to EDI with the selected hub, as described above for step 462. At step 482, the user is prompted to select additional hubs, and the process of identifying hubs continues until the user has identified all the hubs with which the user trades or wishes to trade.

If no hubs are selected by the user or no hubs identified by the user can be found in the host server's directory, the user is asked if she requires more assistance, as shown in steps 484 and 486. If the user requires assistance, an email message is automatically generated and sent to a telemarketing or sales group, as shown in step 488, to initiate a follow-up telephone call or other action to assist the user. If one or more hubs are identified and found in the directory, the user is prompted whether to continue with a return on investment (ROI) analysis, as shown in step 490. If the user does not wish to continue, the user is asked whether to save the information entered by the user during the session to enable the user to access the host server again in the future and resume the process where the user left off in a second session, as shown in steps 491 and 492. This ability to save entered information and resume the funnel process at a later time is preferably provided at various points throughout the funnel process. If the user wishes to continue with a ROI analysis, the analysis is performed at step 494. This analysis is preferably performed based on information entered by the user and using assumptions and standard industry data.

At step 495, the results of the ROI analysis are presented to the user. Included with these results is information relating to products for EDI with the hubs selected by the user, as shown in step 497. This information preferably includes a description of the software packages necessary to support different types of commercial transactions with the hubs, and particular configurations of the software specifically applicable to the selected hubs. If the user decides to sign up for an EDI mailbox upon reviewing the ROI results, the user proceeds to registration for the mailbox service, as shown in step 498 (and shown in more detail in FIGS. 7 and 9).

At the end of the funnel, if the user chooses to register for a product or service, registration begins for the appropriate product or service. In addition to accessing registration via the funnel, a user can bypass the funnel and proceed directly to registration by selecting a link that takes them directly to the registration page for a particular product or service. In this case, the user has navigated directly to the registration page for the product or service. Some qualification funnel pages, such as "select hub" and "display program details" may be included during registration to capture needed information from third parties.

The qualification funnel and registration process can be lengthy in cases where the user is identifying several hubs or registering for a product requiring many types of information. Because of this, the qualification and registration pages may include the ability to save current work for later retrieval and continuation of a process. This functionality executes when a user requests it by clicking a button on any given form. The current state of the user's qualification/registration will be saved to a database table for later retrieval. A cookie is sent to the user's browser and the user can continue with the qualification/registration within certain time of setting that cookie. This may be accomplished by subtracting the current date from the date the cookie was set, and comparing the resulting difference to a threshold value. If the difference is less than the threshold, then the user will be permitted to continue the registration process where she left off. After saving the information, users are instructed to select a link on GEGXS.NET to continue the qualification/registration at a later time.

Since the qualification funnel process is a large decision tree that dynamically determines required pages based on user input, processing logic resides in several related controller classes that coordinate the flow of the application. This controller process is utilized for both user qualification and registration.

Referring to FIGS. 5-9, the registration process is described. The registration modules allow users to sign up for different types of products or services. One of the main goals of the registration modules is to collect common user information applicable to all products and services, and also collect application specific information when a user signs up for a particular product or service. This means that once a user has signed up for one product or service, the application will not require the user to fill out the common information again. Only the application specific information is required to be entered for the newly requested product or service.

Similarly to the qualification funnel application, the registration modules utilize a decision tree approach that gathers information and "walks" the user through a series of questions. The questions are preferably presented in a series of displays with preformatted fields labeled to indicate the nature of the information to be entered by the user into the fields. Information entered into predetermined areas or fields of the displays is designated as common registration information. The information entered by the user on one display may then be used to determine the next display shown to the user.

A user can sign up for one or more application services. For example, a user can join a hub and start trading once he signs up for a service. The registration modules provide registration functionality to guide a user through the registration process. When a user signs up for one service, application specific information and common registration information is collected. The user is automatically registered for a default networking service. If a user decides to register for another application service, all the common registration information (which was previously entered) will be pre-populated for the registration of the new service. This function may be accomplished by comparing the registration information elements for the old service to the new service and determining common information elements. Alternatively, a predetermined set of common registration information elements may be configured, and the information previously entered for these common registration information elements would be used to prepopulate registration information for a new service The registration modules allow users to update any of the pre-populated common registration information.

The registration architecture may be designed to allow instantiation of user data in a common repository so that users will be able to access all of the products and services offered by the host organization and the user will be uniquely recognized from one service to another. This will also permit simplified customer relation management (CRM).

Registration is broken down into components that capture and validate all registration information for a given module. These registration components are designed so that a given registration can utilize a flexible number of these components and dynamically vary the number of registration pages needed. The registration modules include a module for collecting common registration information and modules for registering for specific services and products.

Figure 5:
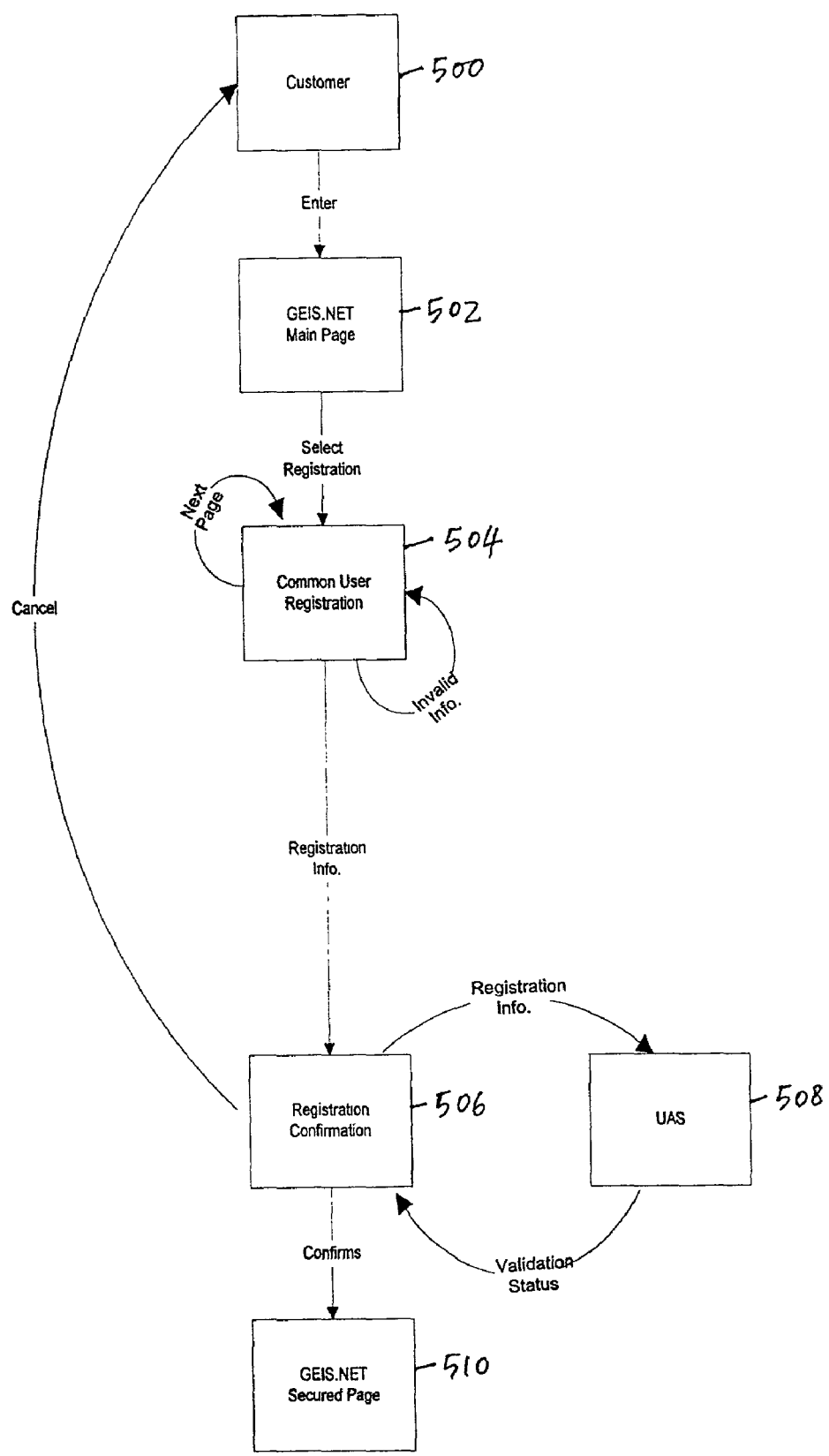
FIGS. 5-9 are flowcharts showing the registration process for EC/EDI products and services.

FIG. 5 shows the registration module for collecting the common registration information. A user accesses the web site, as shown in steps 500 and 502, and chooses to register for a product or service. Alternatively, the user may enter the registration process via the qualification funnel of FIG. 4. In step 504, the user is prompted to enter common user registration information such as user ID, address, contact name, and company name. Form field validation is preferably performed for the common registration pages to minimize the risk of incomplete data.

Once the general information has been entered the user has the choice to sign up for a service. If the user signs up for a second service, the general information is stored in a unified directory and the application specific data is entered in the applications database. The unified directory permits the general information to be made available for multiple applications.

A contract agreement page is displayed to the user to confirm the subscription of this service, once the specific registration application pages are validated and completed. Once the user confirms the contract agreement, a secured page will be shown to the user with a list of subscribed application services and links to the unsubscribe services. Once a user confirms the contract agreement of an application service, this registration information will be sent to the Unified Administration Service (UAS) for validation and UAS will perform all the necessary operations for this request, as shown in steps 506 and 508. If an error occurs in UAS, a friendly error page will be generated to the user. Otherwise, the secured page will be displayed with a list of all the services that the user has subscribed to, as shown in step 510. The service information will be retrieved from UAS. The user will also be authenticated through the SiteMinder agent.

If the user decides to cancel the contract agreement, no information will be sent to UAS. The user will be redirected back to the main page. However, the common and the application specific information will be stored in a session. If the user decides to register the same service again, as long as the user is still in session, all the registration information will be pre-populated. If the user decides to sign up another service which is different from the previous one, only the common registration information will be loaded from the session and pre-populated on the screen.

Figure 6:
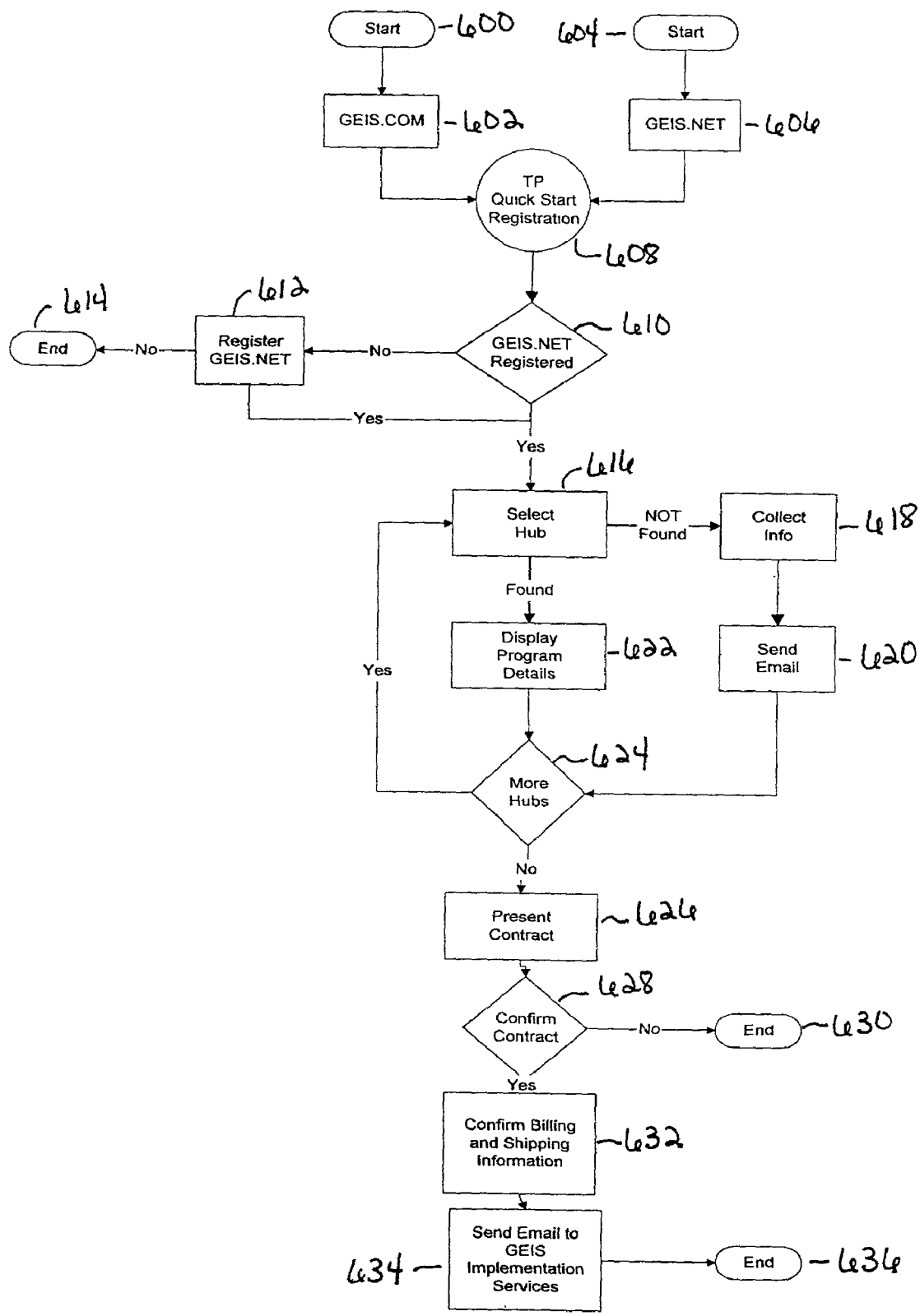

FIG. 6 illustrates a registration process for a specific service. This enables the user to navigate directly to the registration process for the service rather than progress through the funnel described in FIG. 4. The user may access the registration module through one or more different web sites, as shown in steps 600 to 606. The user chooses to register for the service, as shown in step 608. If the user is not registered as a user of the host server, the user is prompted to register, as shown in steps 610 and 612. After registration as a host server user, the user is prompted to select a hub at step 616. This is the hub with which the user is trading as a supplier or user (or which the user wants to begin trading with). The host server will search for all existing hubs and provide a list of the hubs from which the user can make a selection. The host server may also permit the user to enter the name of a hub and match the entered name with a directory of existing hubs. If the hub identified by the user cannot be found in the host server's directory, additional information is collected from the user at step 618, and an email message is automatically generated and sent to the appropriate administration group at step 620, in order to initiate a follow-up telephone call or other action to resolve the problem.

If the user selects a hub found in the directory, information regarding the details of the EDI facilities available on the selected hub is presented to the user, as shown in step 622. This information may include, for example, the identity and description of the software packages necessary to support different types of commercial transactions with the hub, and may include particular configurations of the software specifically applicable to the selected hub. The user may select additional hubs at step 624 and repeat the process as shown in the flow diagram.

Once the user has selected all of the relevant hubs, a contract agreement page is displayed to the user to confirm the subscription of this service, as shown in step 626, once the specific registration application pages are validated and completed. The user confirms the contract agreement, at step 628, and shipping and billing information are confirmed, and terms and conditions are approved, at step 632. At step 634, an email is automatically generated and sent to the implementation services group to initiate the process of providing installation, configuration, or any other services required to implement or assist with the purchased service.

Figure 7:
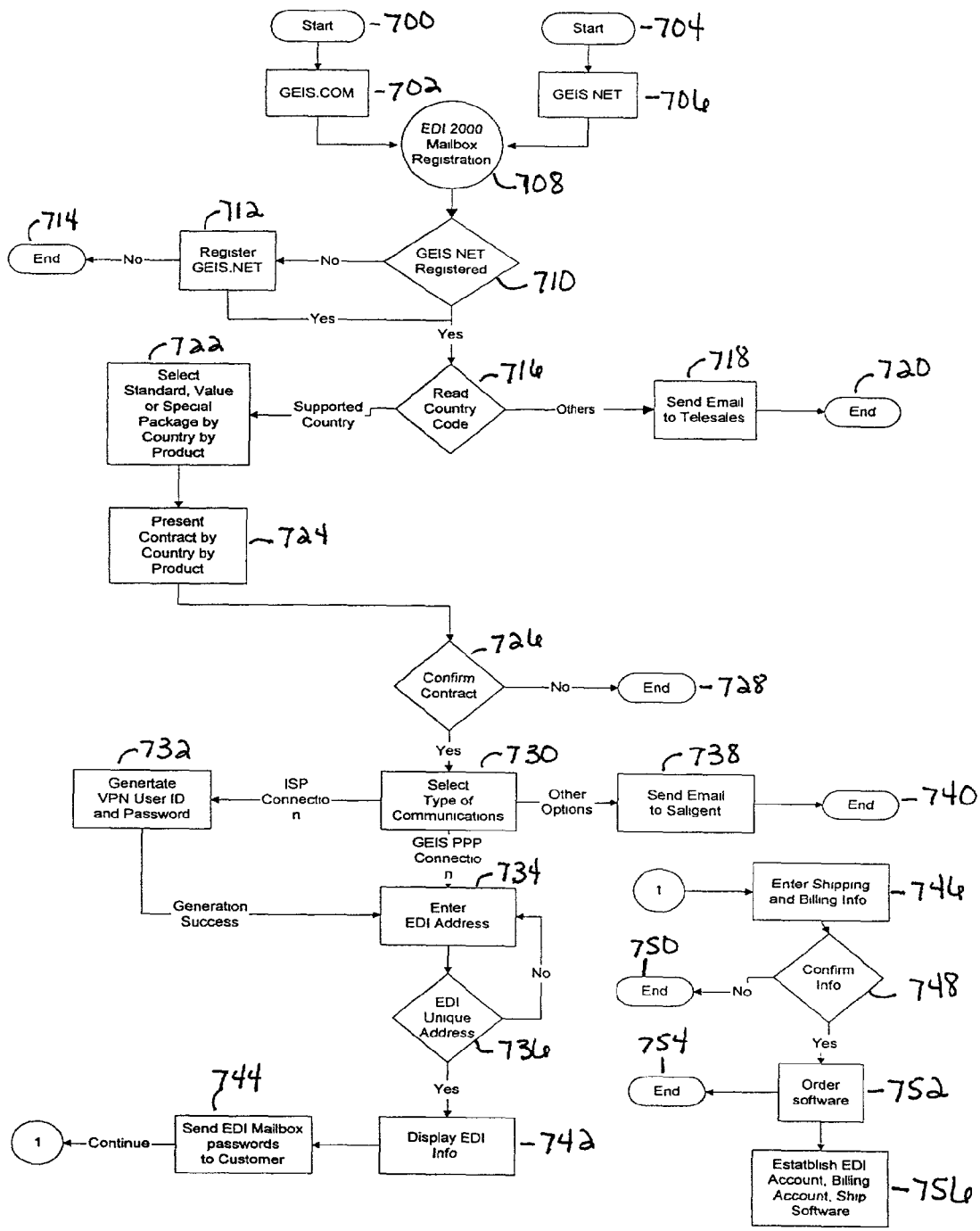

FIG. 7 illustrates registration for an EDI mailbox service. The user may navigate directly to this registration module via one or more different web sites, as shown in steps 700 to 706, or via the qualification funnel shown in FIG. 4. The user chooses to register for the service, as shown in step 708. If the user is not registered as a user of the host server, the user is prompted to register, as shown in steps 710 and 712. After registration as a host server user, the country in which the user resides is determined at step 716. If the user's country is not one of the countries supported by the host organization, an email is automatically generated and sent to a telemarketing group to initiate a telephone call or other contact with the user to determine how the user's requirements can be met, as shown in steps 718 and 720.

If the user's country is supported by the host organization, EDI mailbox service packages appropriate for the user's country is selected, and the user may be given the option of selecting different service packages, as shown in step 722. For example, the user may be prompted to select a standard, value, or special package appropriate for the user's country. At step 724, a contract agreement page is displayed to the user to confirm the subscription for the EDI mailbox service. The contract agreement is tailored to the user's country and the selected service package. At step 726, the user is prompted to confirm the contract agreement. If the user does not confirm the contract, the process ends at step 728. If the contract is confirmed, the user is prompted to select the type of communications that the user wishes to use to connect to the EDI mailbox, at step 730. If the user selects communication via an internet service provider (ISP) or via the host organization's private network, the host server generates a user ID and password (for ISP connections) and prompts the user to enter an EDI mailbox address, as shown in steps 732 and 734. The user is prompted to select a different EDI mailbox address if the initially selected address is already assigned to another user. This process continues until a unique address is selected, as shown in steps 736 and 734. If the user selects communication via a means other than an ISP or the host's private network, an email is generated and sent to a telemarketing and sales group to initiate a telephone call or other follow-up with the user to determine the required information to set up the communication link, as shown in steps 738 and 740.

Once a unique EDI mailbox address has been selected, the address is displayed and one or more passwords are sent to the user, as shown in steps 742 and 744. At step 746, the user is prompted to enter shipping and billing information if this has not already been entered, and at step 748 the user confirms the information. No EDI mailbox is assigned and the registration process ends if the user does not confirm the shipping and billing information, as shown in step 750. The user is given the opportunity to order any software required to implement the user's desired EDI process, and an EDI account and billing account are established for the user, and any software that was ordered is shipped, as shown in steps 752 to 756.

Figure 8:
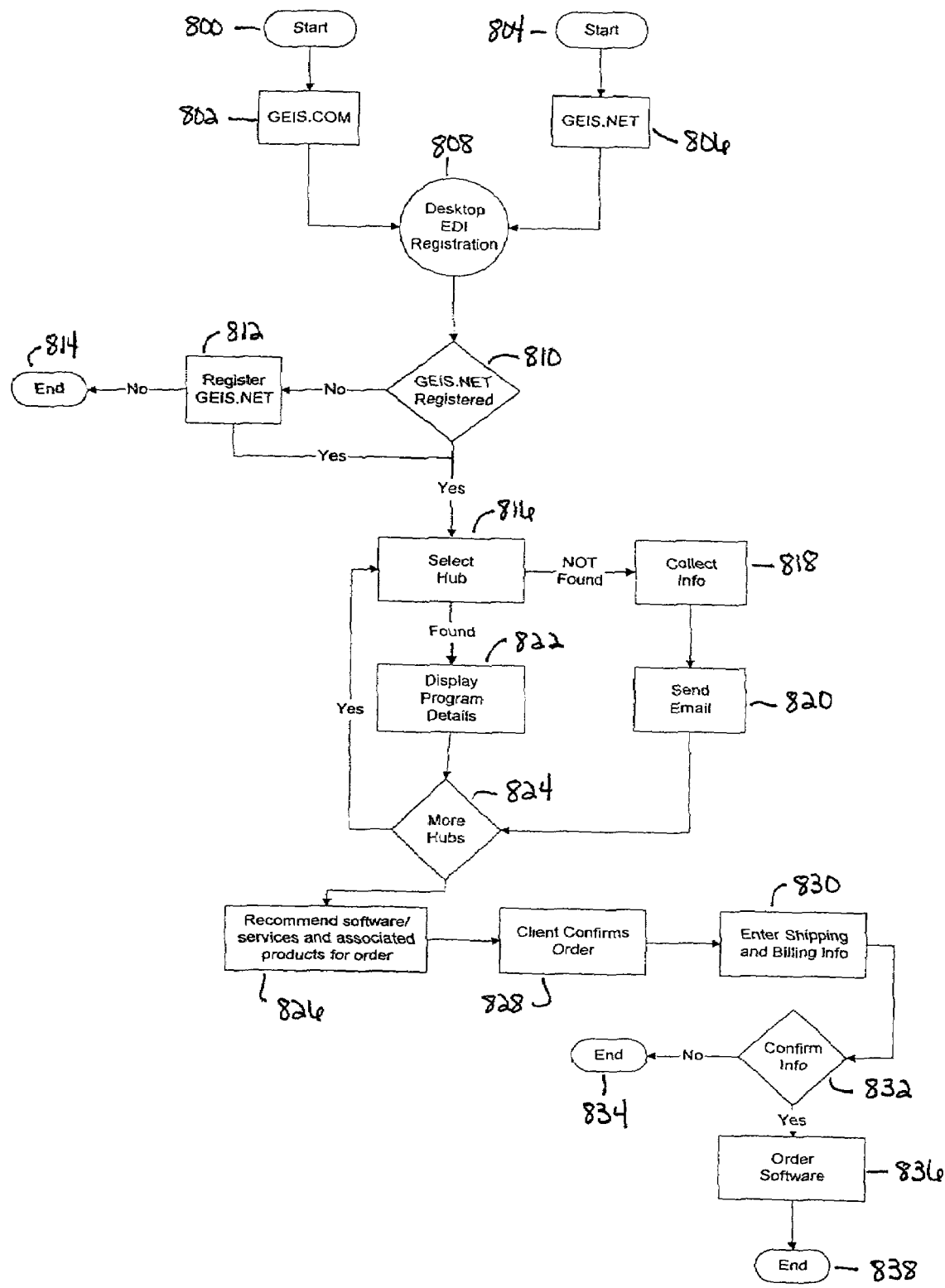

FIG. 8 illustrates registration for EDI software associated with the mailbox service. The user may navigate directly to this registration module via one or more different web sites, as shown in steps 800 to 806, or via the qualification funnel shown in FIG. 4. At step 808, the user chooses to register for the software. If the user is not registered as a user of the host server, the user is prompted to register, as shown in steps 810 to 814. After registration as a host server user, the user is prompted to select a hub at step 816. This is the hub with which the user is trading as a supplier or customer (or which the user wants to begin trading with). The host server will search for all existing hubs and may provide a complete or limited list of the hubs from which the user can make a selection. The host server may also permit the user to enter the name of a hub and match the entered name with a directory of existing hubs. If the hub identified by the user cannot be found in the host server's directory, additional information is collected from the user at step 818, and an email message is automatically generated and sent to the appropriate administration group at step 820, in order to initiate a follow-up telephone call or other action to resolve the problem.

If the user selects a hub found in the directory, information regarding the details of the EDI facilities available on the selected hub is presented to the user, as shown in step 822. This information may include, for example, the identity and description of the software packages necessary to support different types of commercial transactions with the hub, and may include particular configurations of the software specifically applicable to the selected hub. The user may select additional hubs at step 824 and repeat the process as shown in the flow diagram.

Once the user has selected all of the relevant hubs, the host server recommends appropriate software, services, and associated products for the user's desired EDI process, as shown in step 826. This recommendation will be based on the information entered by the user, in particular the identification of hubs with which the user wishes to trade. At step 828, the user selects any services or products which the user wishes to order, and confirms the order. The user is prompted for shipping and billing information if this has not already been entered, and confirms the information and terms and conditions, as shown in steps 830 to 834. At step 836 the order for software, services, or other products is placed and the registration process ends, as shown in steps 836 and 838.

Figure 9:
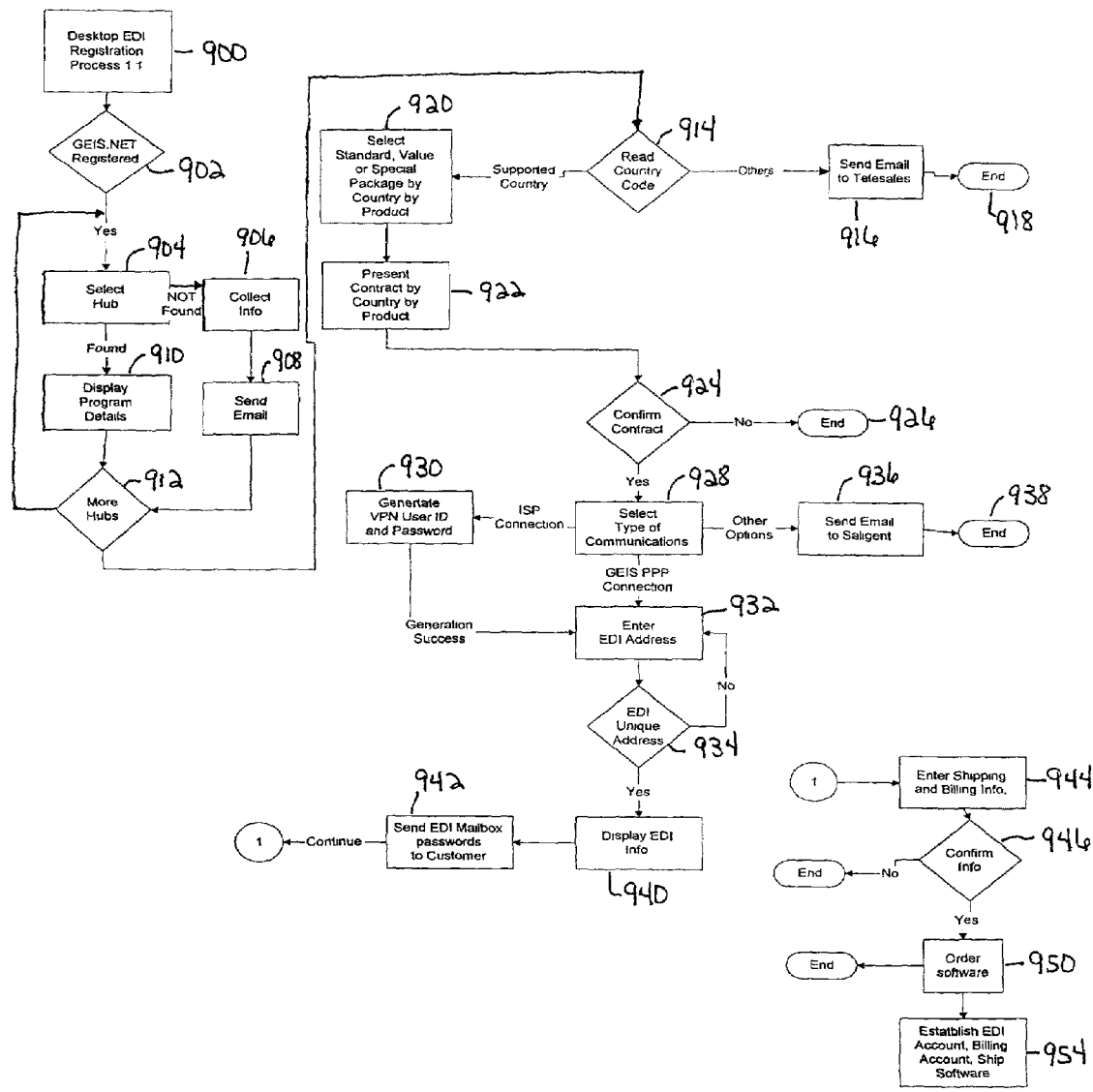

FIG. 9 illustrates registration for an EDI mailbox software subsequent to the registration process for EDI software shown in FIG. 8. The user is prompted to select a hub at step 904. This is the same process described in FIGS. 4 and 6. Additional information is collected from the user at step 906 if the hub identified by the user cannot be found in the host server's directory, and an email message is automatically generated and sent to the appropriate administration group at step 908, in order to initiate a follow-up telephone call or other action to resolve the problem. If the user selects a hub found in the directory, information regarding the details of the EDI facilities available on the selected hub is presented to the user, as shown in step 910. The user may select additional hubs at step 912 and repeat the process as shown in the flow diagram. At step 914, the country in which the user resides is determined, and the mailbox registration process continues as shown in steps 916 to 954 in the same way as shown in FIG. 7, steps 718 to 756.

Figure 10:
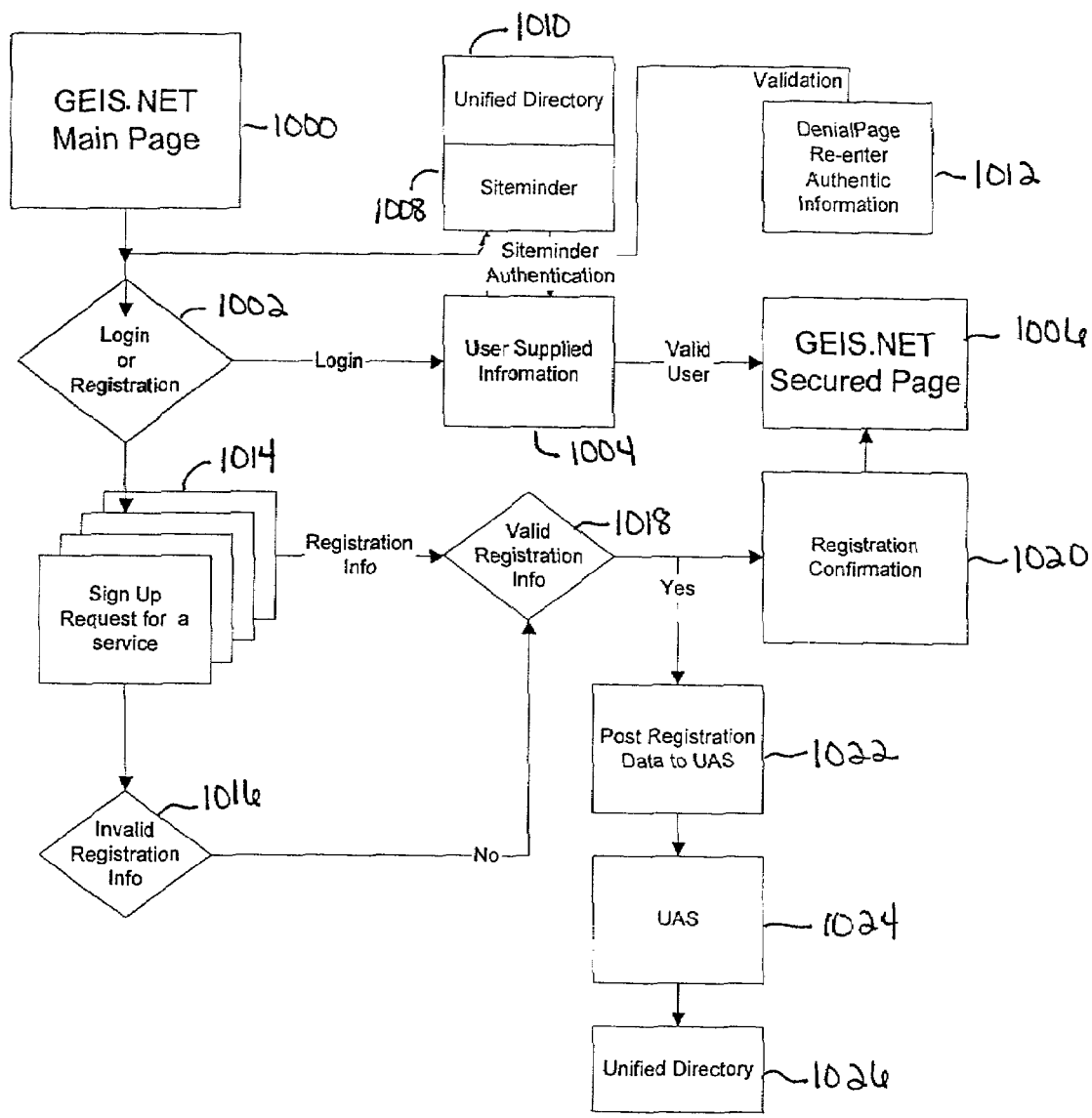
FIG. 10 is a flowchart showing a user logon process.

As shown in FIG. 10, registered users logon and use the subscribed services such as using a networking service. During the logon process the user is authenticated and a secured page is then displayed, displaying a list of subscribed services and links to inscribed service.

Users access the host server and either logon (if already registered) or begin the registration process, as shown in steps 1000 and 1002. If a user is already registered, the user logs by providing a user ID and password and any other required information, and gains access to the secured area of the host server if the data is valid, as shown in steps 1004 and 1006. During this process, the Siteminder application performs authentication of the user, using data previously stored in the unified directory during the registration process, as shown in steps 1008 and 1010. If authentication of the user fails, an access denial page is displayed to the user and the user is given the opportunity to reenter corrected information, as shown in step 1012.

If the user has not previously registered, the user goes through the registration process, as shown in step 1014. If the registration information is valid, the user's registration is confirmed and access is granted to the secured pages of the host server, as shown in steps 1016 to 1020. During this process, common registration information is sent to the Unified Administration Service (UAS) for storage in the unified directory, as shown in steps 1022 to 1026. This ensures that the user's common registration information will be available to multiple applications to enable authentication and permit common registration information to be used during registration for additional products or services.

Figure 11:
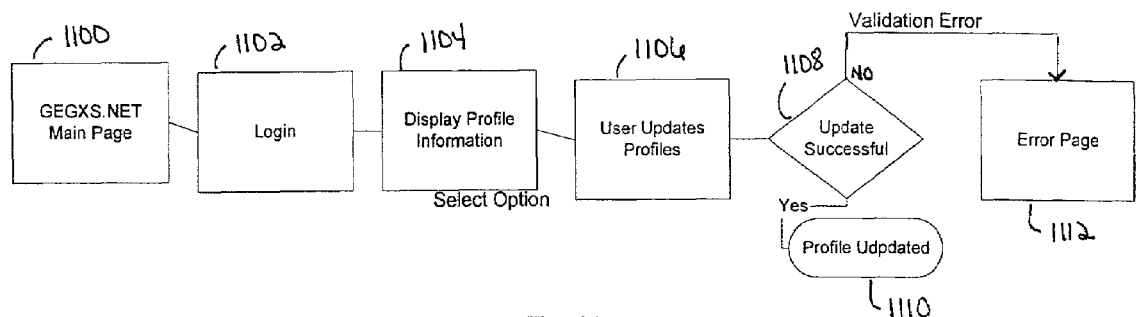
FIG. 11 is a flowchart showing a user information update process.

As shown in FIG. 11, a user profile component subsystem may be included to allow users to maintain and update their user profile and personalization information for managed applications. This user profile information may include personal data such as name, address, phone number, fax number etc. as well as information on the preferences of the user. Users can update their user profile information after they sign up for services. Common information for all users, such as name and contact information, is applicable to all applications accessed via their GEGXS.NET user name. In addition, some of these applications may have application specific information that can also be maintained and updated in an application specific profile. For example, a user's product ordering application profile may include ship to and billing information (shipping address, shipping method, billing address, payment method, etc.) as well as other information such as price bundle code (which enables users to change their pricing arrangement on an adhoc basis). This application specific profile information may be updated by the user.

When a user navigates from their secured GEGXS.NET home page to the profile maintenance menu, as shown in steps 1100 and 1102, a dynamic list of application profiles that they can maintain will be generated by a call to UAS. Once a user selects a profile to maintain, the given profile's information will be retrieved and displayed in a maintenance page, as shown in step 1104. After the user selects "OK" or "Update", the appropriate data source (an Enterprise Java Bean or database) will be updated and the user will return to the profile maintenance menu page, as shown in steps 1106 to 1110. A validation check is performed on the updated information and an error page is displayed indicating the problem if the validation fails, as shown in step 1112.

The list of profiles that a user has may be generated after a call to UAS. In addition, this processing may also access a local data store (e.g. an Oracle database) to retrieve local profile information. Depending on the option selected, profile information may be retrieved and saved, for example, to UAS, a local data store, and/or a product ordering application Enterprise Java Bean. An Enterprise Java Bean (EJB) is a service that multiple applications can use. For example, an EJB may provide the ability to place an order over the web that ultimately gets fulfilled on a legacy mainframe system. An EJB may be created that can be used by any application, rather than each application requiring it's own logic/interface to the mainframe system.

GEGXS.NET integrates with several additional web applications from a page flow perspective. In some cases, GEGXS.NET and these other applications are integrated and exchange information to provide a continuous user experience. In other cases, GEGXS.NET simply provides secure home page access before users link to these other applications. In either case, GEGXS.NET integrates with these applications as seamlessly as possible, minimizing its impact on these other applications, and provides navigation options back to the user's GEGXS.NET home.

Figure 12:
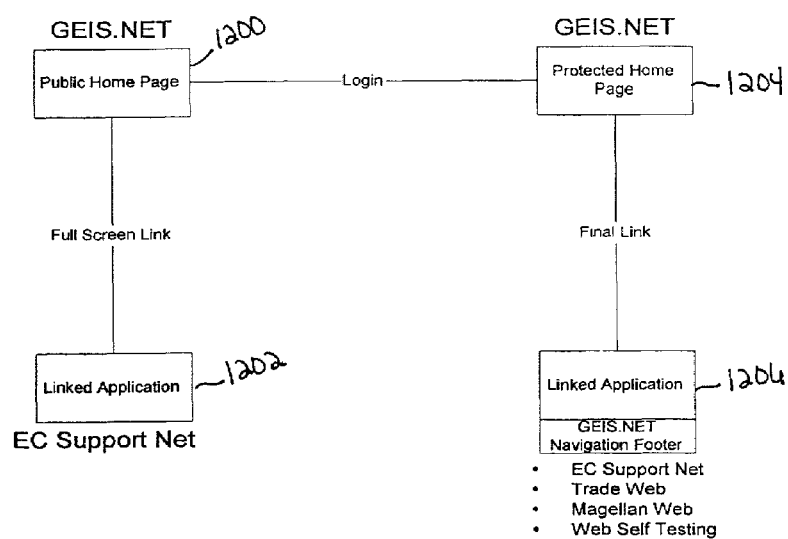
FIG. 12 is a flowchart showing the public and private areas of the host server.

As shown in FIG. 12, the GEGXS.NET web application is divided between public areas 1200 and 1202 and protected areas 1204 and 1206. The public area of GEGXS.NET includes all qualification and registration pages while the protected area of GEGXS.NET provides access to additional applications for registered users. On both the public and private areas, GEGXS.NET integrates with other web applications from a screen flow perspective.

Seamless navigation is an important part of the GEGXS.NET application. The type of navigation performed depends on whether the applications are included in a single sign-on process so that the GEGXS.NET user name and password control access to the application, and the degree of required access control (e.g., whether the GEGXS.NET links are maintained on the public home page or protected home page).

Besides providing access to applications protected by GEGXS.NET authentication, some applications are simply links from GEGXS.NET. These are not included in the GEGXS.NET single sign-on process and they typically require their own user name and password, independent of the GEGXS.NET user name and password. The navigation approach used may depend on where the user links to the application. When linking to the application from the public page, GEGXS.NET will display an application in the full browser. When linking from the protected user's section, it will include a GEGXS.NET footer so users can navigate back to GEGXS.NET. All integration in this module occurs at the presentation level. In the event an error has occurred in one of the GEGXS.NET components, an entry is made into a log file with all the details. The host server validates the error with respect to the error-properties file. Following a validation entry will be made in the log file. The error properties file will contain all the information regarding each of the error codes.

A search capability is preferably provided for users using the system described above. The search engine, in a preferred embodiment, uses a Sun SPARC™ family workstation or server, or Intel™ compatible PC with Pentium™ class processor, running the Solaris 2.6™ operating system software. Physical memory required will depend on the number of documents/web pages that the search engine is required to search through when a search is performed. The memory specifications indicate the desired amount of server side memory required to support the associated number of documents against which the search will be performed. For example, memory is preferably 64 MB for <1000 documents, 128 MB for >1000 documents, 256 MB for >10,000 documents, 512 MB for >100,000 documents, and 1 GB for >1,000,000 documents. Memory requirements may vary depending on number of collections and query rates. In addition, available swap space for <1,000 documents is preferably 128 MB, and this requirement may vary depending on number of collections and query rates. Disk space of 10 MB is preferably provided for the application. The network is preferably TCP/IP over local or wide area network.

The search engine preferably provides fast searches and relevant results, using easy to use natural language queries and a full set of search operators. The search engine preferably features simple administration with easy install and startup and remote management via a browser. A real-time index is preferably provided so that deleted documents are immediately removed and new documents are instantly added, and new/changed content automatically found. An add URL is preferably provided to let users submit their own changes.

An adaptive, flexible spider, in a preferred embodiment, is provided with adjustable revisit frequencies, link depth, and directory depth. The ability to cross firewalls and index password-protected sites is preferably provided, automatic duplicate removal with preference filter, and the ability to adapt to handle even very large Intranets and to be tuned to limit load on servers and networks.

Full-Text Search capability, in a preferred embodiment, is provided to search for any word or phrase, with features for query refinement (search only these results), automatic proper name and phrase recognition, natural language queries, summaries to help users find relevant documents, stemming to match all inflections of terms, automatic use of spacing variants (e.g., "oracle 8" matches "oracle8", "Oracle 8" and "Oracle-8"), and term highlighting in title and summary on search results pages.

The search engine is preferably completely customizable, including the ability to customize the user interface, results ranking, and other items, the ability to include/exclude at the site, directory, or document level, the ability to create and search your own fields, and a customizable thesaurus and stemming dictionary.

Thus, one embodiment of the invention has been described providing an online system and method for determining and fulfilling a user's needs for electronic commerce services and products. However, the described embodiment could be readily modified using conventional techniques well known to those of skill in the art to accommodate the varying requirements of different computer systems. Accordingly, it should be understood that the methods described herein are illustrative only and are not limiting upon the scope of the invention.

What is claimed is:

1. A method for providing electronic commerce electronic data interchange (EDI) products and services for EDI between a user and one or more trading partners, the method comprising the steps of:

providing a host server for access by said user;

obtaining first information from said user to identify a plurality of selected trading partners for exchanging EDI information related to trading with the selected trading partners;

retrieving requirements information relating to predetermined electronic commerce EDI requirements of said selected trading partners;

automatically determining, by the host server, suitable electronic commerce EDI products or services for said user based at least in part on said requirements information from said selected trading partners; and obtaining registration information from said user to register said user for one or more of said suitable EDI products or services.

2. A method as claimed in claim 1, wherein said server retrieves said requirements information from a database containing electronic commerce EDI requirements information for a plurality of hub trading partners.

3. A method as claimed in claim 1, wherein said step of obtaining registration information comprises prompting said user to enter information into one or more preformatted displays.

4. A method as claimed in claim 3, further comprising the steps of:

dividing said registration information into common registration information and other registration information; and storing said common registration information so that it is readily accessible in a block.

5. A method as claimed in claim 4, wherein registration information, entered by said user into predetermined areas of said one or more preformatted displays, is designated as common registration information.

6. A method as claimed in claim 4, wherein said step of obtaining registration information comprises prepopulating one or more of said preformatted displays with common registration information previously entered by said user.

7. A method as claimed in claim 6, wherein said step of obtaining registration information comprises a plurality of sessions, information entered during a first session being stored and retrieved during a second session.

8. A method as claimed in claim 7, wherein first date information is stored indicating a date when said first session information is entered, said first date information is compared to current date information to determine if said information entered during said first session can be used for said second session.

9. A method as claimed in claim 8, wherein said first date information is determined from a cookie sent to a user's browser.

10. A method as claimed in claim 1, further comprising the step of prompting said user for configuration information to configure one or more of said products or services.

11. A method as claimed in claim 1, further comprising the step of automatically generating and sending a message to a sales channel to follow up in providing electronic commerce products or services desired by said user.

12. A method as claimed in claim 1, further comprising the step of generating return-on-investment information relating to an e-commerce product or service and providing said return-on-investment information to said user.

13. A method as claimed in claim 1, further comprising the step of accepting an order for one or more of said products or services from said user.

14. A method as claimed in claim 1, wherein said server obtains said registration information from said user by generating prompts according to a decision tree.

15. A method as claimed in claim 14, wherein server logic for generating said prompts resides in controller classes which co-ordinate logic flow.

16. A method as claimed in claim 1, wherein said server prompts said user to enter said registration information into one or more displays which are dynamically generated based on previously entered information.

17. A method as claimed in claim 16, wherein said step of obtaining registration information comprises using registration page modules for receiving and validating at least a portion of said registration information.

18. A method as claimed in claim 17, wherein said step of obtaining registration information comprises linking said user to remote applications.

19. A system for providing electronic commerce electronic data interchange (EDI) products and services for EDI between a user and one or more trading partners, the system comprising:
   a database for storing requirements information relating to predetermined electronic commerce EDI requirements of a plurality of trading partners;
   an application for obtaining first information from said user to identify a plurality of selected trading partners for exchanging EDI information related to trading with the selected trading partners, retrieving requirements information from said database based at least in part on said first information, and automatically displaying suitable electronic commerce EDI products or services to said user based at least in part on said requirements information; and
   a registration module for obtaining registration information from said user to register said user for one or more of said suitable EDI products or services.

20. A system as claimed in claim 19, wherein said database stores electronic commerce EDI requirements information for a plurality of hub trading partners.

21. A system as claimed in claim 19, wherein said registration module obtains said registration information by prompting said user to enter information into one or more preformatted displays.

22. A system as claimed in claim 21, wherein said registration module divides said registration information into common registration information and other registration information, and stores said common registration information so that it is readily accessible in a block.

23. A system as claimed in claim 22, wherein said registration module prepopulates one or more of said preformatted displays with common registration information previously entered by said user.

24. A system as claimed in claim 19, wherein said registration module prompts said user for configuration information to configure one or more of said products or services.

25. A system as claimed in claim 19, wherein said registration module includes a facility for generating and sending a message to a sales channel to follow up in providing electronic commerce products or services desired by said user.

26. A system as claimed in claim 19, wherein said registration module prompts said user to enter said registration information into one or more displays which are dynamically generated based on previously entered information.

27. A system for providing electronic commerce electronic data interchange (EDI) products and services for EDI between a user and one or more trading partners, the system comprising:
   means for obtaining first information from said user to identify a plurality of selected trading partners for exchanging EDI information related to trading with the selected trading partners;
   means for retrieving requirements information relating to predetermined electronic commerce EDI requirements of said selected trading partners;
   means for automatically determining suitable electronic commerce EDI products or services for said user based at least in part on said requirements information; and
   means for obtaining registration information from said user to register said user for one or more of said suitable EDI products or services.

28. A computer program product stored on a computer readable medium having program code, that causes, when executed, a computing system to provide electronic data interchange (EDI) products and services for EDI between a user and one or more trading partners, the program code comprising:
   code for obtaining first information from a said user to identify a plurality of selected trading partners for exchanging EDI information related to trading with the selected trading partners;
   code for retrieving requirements information relating to predetermined electronic commerce EDI requirements of said selected trading partners;
   code for automatically determining suitable electronic commerce EDI products or services for said user based at least in part on said requirements information; and
   code for obtaining registration information from said user to register said user for one or more of said suitable EDI products or services.

* * * * *